No. 814,417. PATENTED MAR. 6, 1906.
W. L. WATERS.
DYNAMO ELECTRIC MACHINE.
APPLICATION FILED JUNE 3, 1904.

Witnesses
Arthur H. Boettcher,
Charles J. Schmidt.

Inventor
William L. Waters
By Charles A. Brown
Attorney

UNITED STATES PATENT OFFICE.

WILLIAM L. WATERS, OF MILWAUKEE, WISCONSIN.

DYNAMO-ELECTRIC MACHINE.

No. 814,417.  Specification of Letters Patent.  Patented March 6, 1906

Application filed June 3, 1904. Serial No. 210,923.

*To all whom it may concern:*

Be it known that I, WILLIAM L. WATERS, a subject of the King of England, residing at Milwaukee, in the county of Milwaukee and State of Wisconsin, have invented a certain new and useful Improvement in Dynamo-Electric Machines, of which the following is a full, clear, concise, and exact description, reference being had to the accompanying drawings, forming a part of this specification.

My invention relates to dynamo-electric machines, and principally to such machines employing commutators; and its object is to provide improved means for rendering the magnetic field of the machines more suitable for commutation, my invention being of particular adaptation to alternating-current motors having salient poles.

I find that by connecting together the sides of the poles near the faces thereof with a solid magnetic ring the distribution of lines in the commutating-field between two poles is so altered as to produce a field much more suitable for commutation than the ordinary type of magnet-pole, the machine when thus provided possessing properties intermediate between standard projecting-pole construction and the continuous type of field used principally in induction-motors.

Figure 2:
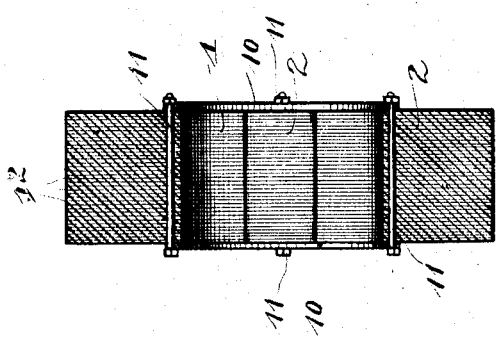
Figure 1:
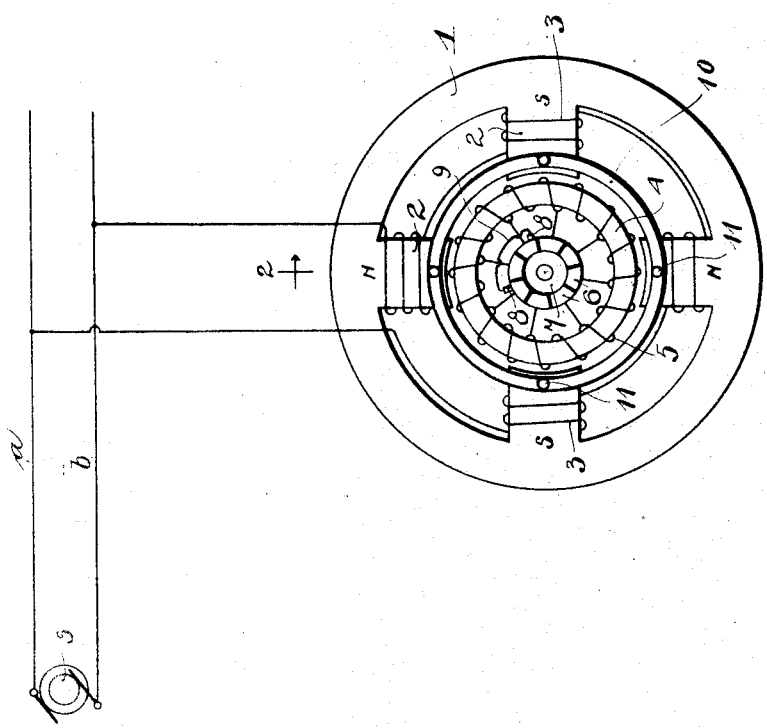

In Figure 1 of the accompanying drawings I have shown a single-phase alternating-current motor provided with magnetic rings, and in Fig. 2 I have shown a cross-sectional view of the field-frame on line 2 2 of Fig. 1.

I have shown a four-pole field-frame 1, having salient poles 2 2, these poles being provided with energizing-windings 3 3, connected with the line-limbs $a$ and $b$ of a single phase source of current $s$. An armature-core 4 is provided with a winding 5, connected at intervals with the segments 6 6 of a commutator 7, brushes 8 8 engaging said commutator and suitably connected in circuit, in this case being shown as short-circuited by the conductor 9. At each side of the machine I provide a solid magnetic ring 10, preferably of wrought-iron, the rings lying against the sides of the poles near the faces thereof, and bolts and rivets 11 11 pass through the rings and preferably through the center line of the pole-pieces, these bolts or rivets serving to hold the rings in place and serving also to clamp together the laminations 12 12 of the field-frame. These magnetic rings so alter the distribution of the lines of force in the commutating-field that sparking at the brushes is practically eliminated, and these rings may be employed on polyphase machines as well as on single-phase machines, as shown.

I do not wish to be limited to the exact arrangement and construction as shown, as changes may readily be made without departing from the scope of the invention.

I claim as new and desire to secure by Letters Patent—

1. In a dynamo-electric machine, the combination with a field-frame having salient poles, of an armature associated with said field-frame, and a continuous ring of magnetic material at each side of the field-frame and secured to the poles near the faces thereof.

2. In a dynamo-electric machine, the combination with a field-frame having salient poles, of an armature associated with said poles, a continuous ring of magnetic material at each side of the field-frame disposed near the faces of the poles, and bolts passing through said rings and said poles for securing said ring in position.

3. In an alternating-current-motor dynamo-electric machine, the combination with a field-frame having salient poles and composed of laminations, of an armature associated with said poles, a continuous wrought-iron ring at each side of the field-frame and engaging the poles near their faces, and bolts passing through said poles and said rings, said bolts serving to secure the rings in position and also to secure together the laminations from the field-frame.

4. In a single-phase alternating-current motor, the combination with a field-frame having salient poles, of energizing-windings for said poles, an armature associated with said field-frame, a commutated winding on said armature, a commutator for said winding, brushes engaging said commutator, a circuit including said brushes, and a ring of magnetic material at each side of the field-frame, said rings engaging the sides of the poles near the faces thereof and encircling the armature.

5. In an alternating-current motor, the combination with a field-frame having salient poles, of energizing-windings for said poles, an armature associated with said poles, a commutated winding for said armature, a commutator for said winding, brushes engaging said commutator, a circuit including said brushes, a ring of magnetic material at each side of the field-frame, each ring engaging the sides of the poles near the faces thereof, and bolts passing through said rings and said poles for securing said rings in position.

6. In an alternating-current motor, the combination with a field-frame having salient poles, of energizing-windings for said poles, an armature associated with said poles, a commutated winding for said armature, a commutator for said winding, brushes engaging said commutator, a circuit including said brushes, a ring 10 at each side of the field-frame engaging the sides of the poles near the faces thereof, and bolts 11, 11 passing through the rings and through the poles on the center line thereof for securing said rings in position.

In witness whereof I hereunto subscribe my name this 26th day of May, A. D. 1904.

WILLIAM L. WATERS.

Witnesses:
ZEBULON PHEATT,
CHARLES SCHOOL.